United States Patent [19]

Ferrara et al.

[11] E Re. 30,967

[45] Reissued * Jun. 15, 1982

[54] AUTOMATICALLY CONTROLLED WEIGH FEEDING APPARATUS

[75] Inventors: Angelo Ferrara, Fairfield; Ronald J. Ricciardi, Garfield; Alexander A. Urban, Park Ridge, all of N.J.

[73] Assignee: Acrison, Inc., Moonachie, N.J.

[ * ] Notice: The portion of the term of this patent subsequent to Jun. 17, 1992, has been disclaimed.

[21] Appl. No.: 124,052

[22] Filed: Feb. 25, 1980 (Under 37 CFR 1.47)

Related U.S. Patent Documents

Reissue of:

[64] Patent No.: 3,967,758
Issued: Jul. 6, 1976
Appl. No.: 550,639
Filed: Feb. 18, 1975

U.S. Applications:

[63] Continuation-in-part of Ser. No. 345,587, Mar. 28, 1973, Pat. No. 3,889,848, which is a continuation-in-part of Ser. No. 274,844, Jul. 25, 1972, abandoned.

[51] Int. Cl.[3] ..... G01G 11/14

[52] U.S. Cl. ..... 222/58

[58] Field of Search ..... 177/122, 1, 157; 222/58, 36, 55; 318/345

[56] References Cited

U.S. PATENT DOCUMENTS 3,682,263 8/1972 Bonneric ..... 177/122
3,889,848 6/1975 Ricciardi et al. ..... 222/58

*Primary Examiner*—Stanley H. Tollberg
*Attorney, Agent, or Firm*—Davis, Hoxie, Faithfull & Hapgood

[57] ABSTRACT

Disclosed herein is an automatically controlled weigh feeding system including a container prefilled with a substance, a device for discharging the substance from the container at a controllable rate, apparatus for weighing the container and its contents and for producing an electrical signal proportional to that weight, apparatus actuated by the electrical signal for controlling the discharge of the substance from the container, and a detector circuit actuated by the electrical signal for producing an output which is responsive to predetermined excessive excursions of the electrical signal for locking the discharge control apparatus against deviation during the time of the excessive excursion.

16 Claims, 7 Drawing Figures

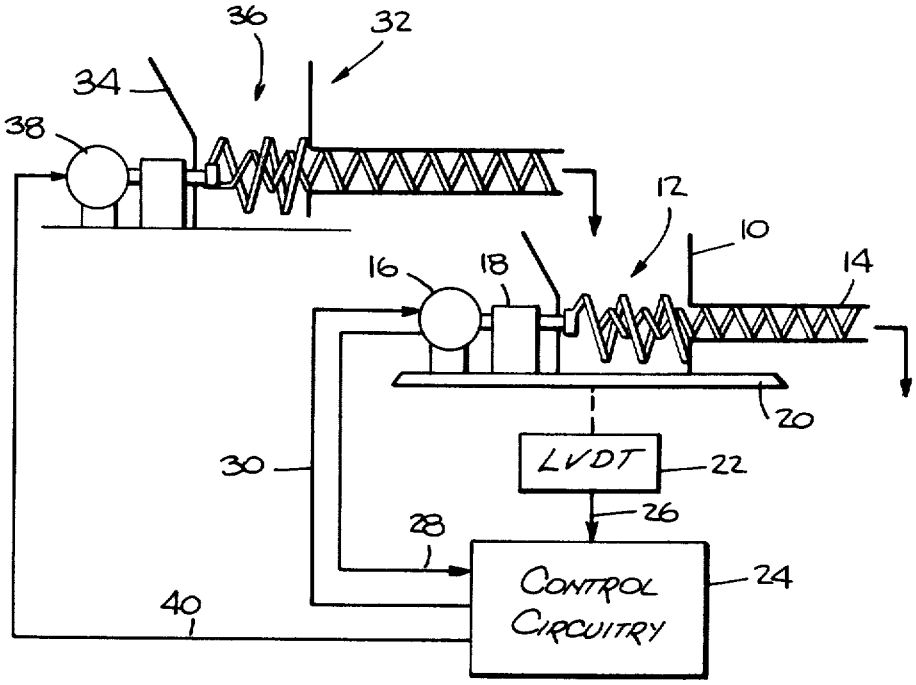
Fig. 1.
Fig. 6.
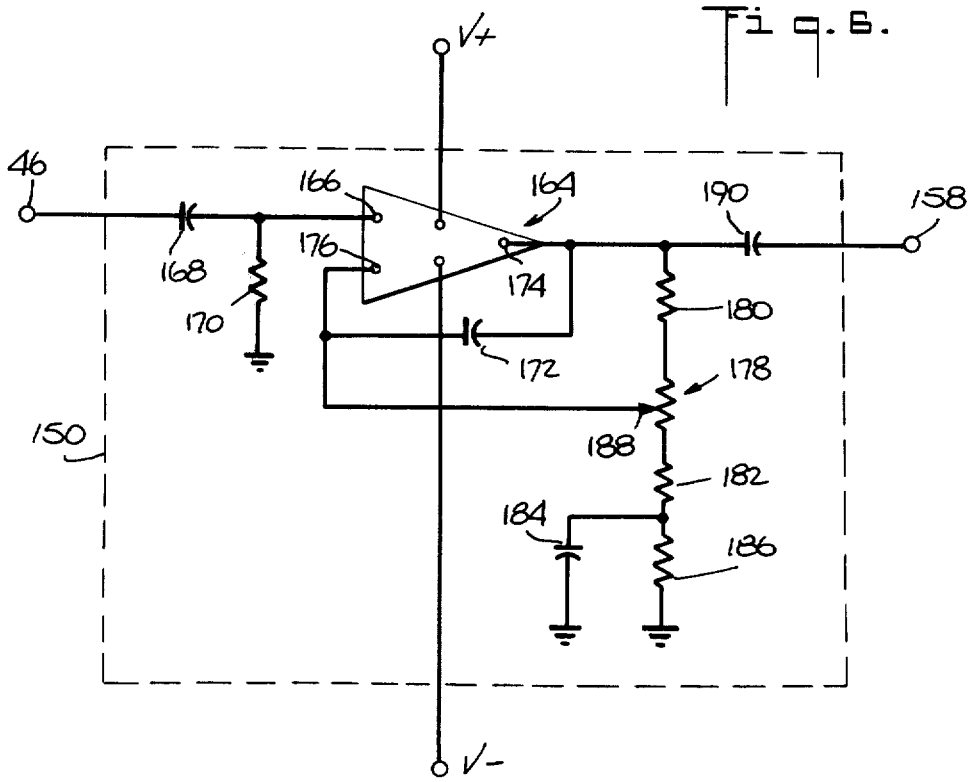

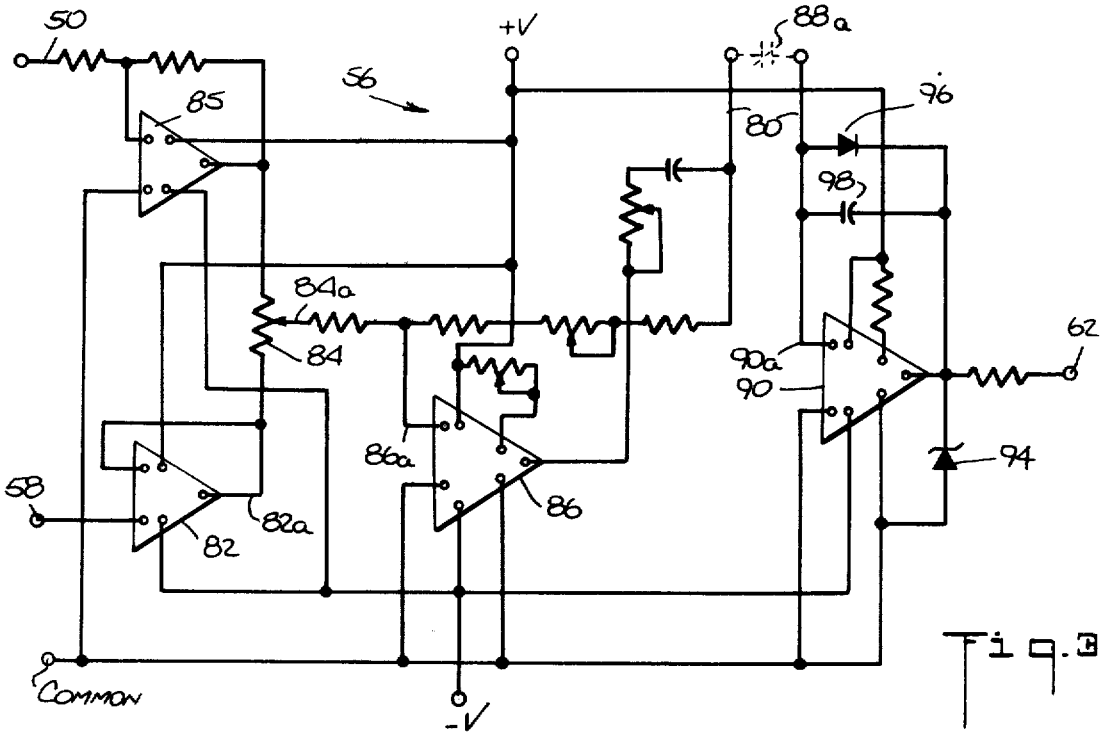
Fig. 3.
Fig. 4.
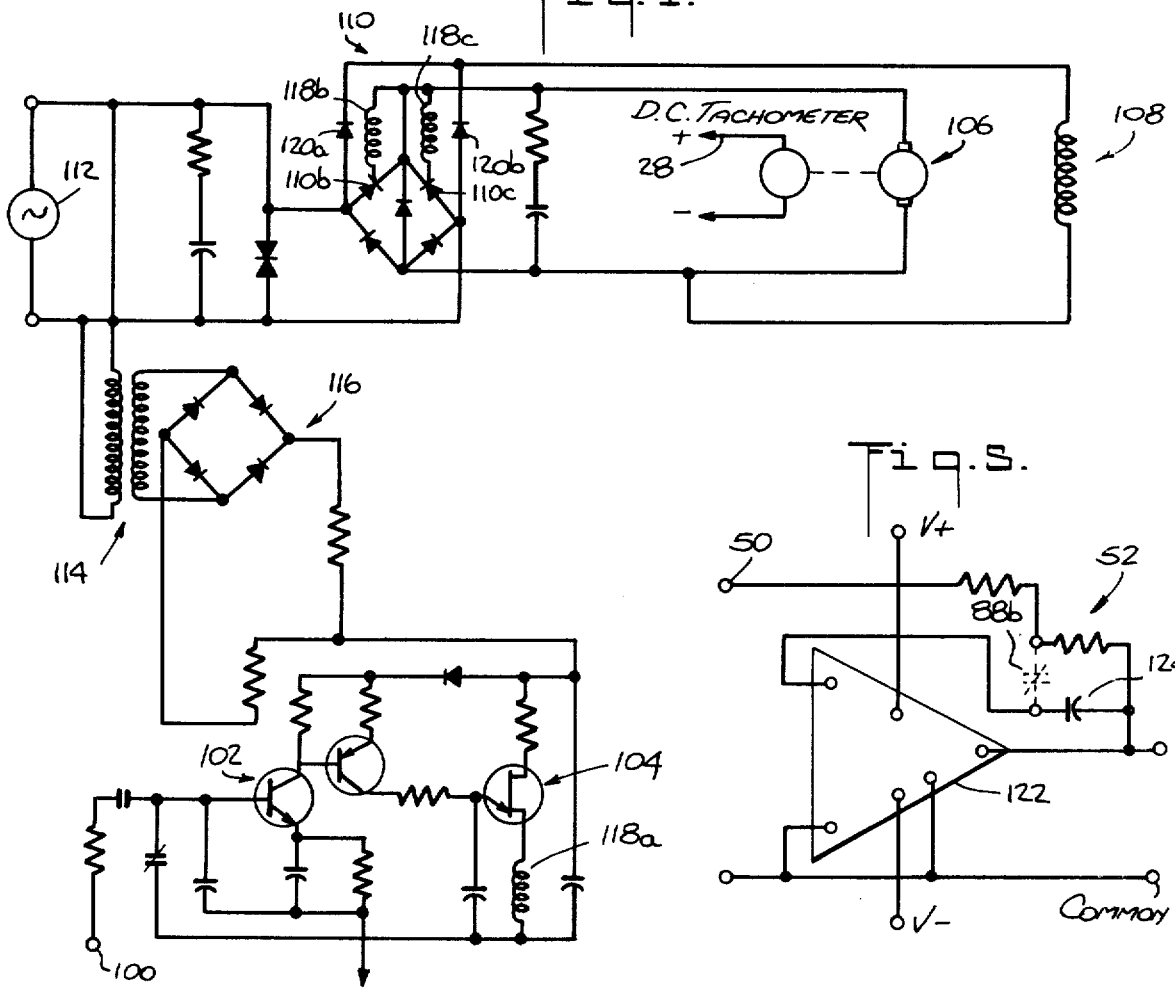
Fig. 5.

AUTOMATICALLY CONTROLLED WEIGH FEEDING APPARATUS

Matter enclosed in heavy brackets [ ] appears in the original patent but forms no part of this reissue specification; matter printed in italics indicates the additions made by reissue.

*This is a continuation-in-part of our copending application Ser. No. 345,587, filed Mar. 28, 1973, which issued as U.S. Pat. No. 3,889,848 and which, in turn, is a continuation-in-part of a parent application Ser. No. 274,844, filed July 25, 1972 (and later abandoned).*

This invention relates to weigh feeding systems and it is particularly applicable to apparatus for feeding particulate solid material. Systems constructed according to the present invention are particularly adapted among other possible uses for accurately weigh feeding a wide variety of substances including dry materials regardless of whether the material is free-flowing, sluggish, or pressure sensitive, and ranging from amorphous powders to flakes, pellets, chunks and even fibers, as well as liquids.

Various controlled weigh feeding systems have been known in the past, as for example, the system disclosed in U.S. Pat. No. 3,494,507, wherein a weighing device is incorporated for providing an output signal which is used as one of the parameters for controlling the discharge rate of the system. Thus, in the above-cited patent, the contents of a container are discharged onto a conveyor moving at a known rate, and the weight of the conveyor is detected, so that the numerical values corresponding to the weight of the conveyor and the speed thereof can be combined to provide a discharge rate signal to an indicator device. It has been found, however, that the system as disclosed in the above-cited patent is highly effective except where extremely low rates and optimum accuracy are required, wherefore it is desirable to provide a weigh feeding system having a discharge rate which can be controlled to a high degree of accuracy, and which can be adjusted from a fraction of a pound per hour upwards.

The present invention is closely related to U.S. Pat. No., 3,889,848 issued June 17, 1975, and is directed to improvements of the apparatus described and claimed therein. In accordance with this application, there is provided a weigh feeding apparatus wherein the discharge rate of a fluid substance from a container is maintained at a predetermined constant value. The container and its contents are weighed, and an electrical signal is produced which signal has an amplitude proportional to the weight of the container and its contents. This electrical signal, which varies as the contents of the container are discharged, is differentiated and applied to a comparator circuit together with a reference signal, wherefore the output of the comparator circuit may be used to control said discharge rate of the substance as it is fed from the container. The comparator output is applied to a signal generator for producing a motor drive signal for a DC motor having its output shaft connected to drive a device for discharging the substance from the container. That signal generator may comprise a pulsing circuit for controlling a pair of SCR's which are disposed in a rectifying bridge circuit connected between an AC voltage source and the input of the DC motor. Accordingly, the speed of the motor is controlled by the pulsing circuit, which, in turn, is controlled by the algebraic sum of the output signal of a tachometer generator which is coupled directly to the motor shaft, and the output signal from the comparator. It can be seen that the above-described apparatus provides an accurate weigh feeding system, whereby the feeding rate may be maintained at a constant value, and wherein the predetermined feeding rate may be adjusted by adjusting the value of the reference signal source.

Additionally, the output of the weighing device may be applied to a pair of differential amplifier circuits, along with a pair of reference voltage inputs, for determining when the contents of the container varies above and below desired maximum and minimum fill levels for the container. That is, circuitry is provided for automatically refilling the container when the weight of the substance therein reaches the desired minimum weight, and for terminating the filling process for the container when the fluid substance therein reaches the desired maximum weight. Such circuitry includes means for maintaining the discharge rate of the container at the constant rate equal to the instantaneous rate thereof immediately preceding energization of the filling device for the container. Particularly, the pair of differential amplifier circuits are coupled to a pair of relay driver circuits for controlling a relay circuit to energize the filling device when the substance in the container reaches the minimum weight, and for maintaining that filling device in an energized state until the container is refilled to its maximum desired level. The relay circuit is also coupled to the comparator circuit, for controlling the latter to produce a constant output during the refilling process for the container, thereby maintaining the discharge rate of the container at the value of the particular discharge rate thereof immediately preceding energization of the filling device.

As pointed out in said U.S. Pat. No. 3,889,848, in certain installations there exists a possibility of physical forces impinging upon the weigh feeder from an external source, such as wind or air currents, physical contact with the weigh feeder by operating personnel, or the like, for example. These forces cause the weigh feeder to move at a rate that is other than that resulting from the linear discharge of the contents of the container. Because such additional movement, i.e. acceleration, is an error and has no direct relationship to the actual discharge of material from the container, the control system could continue to perform its corrective function utilizing the erroneous output signal for comparison with the fixed set point reference signal derivative. The aforementioned patent application discloses one means for preventing such excessive and abnormal movements of the weigh feeder scale from grossly affecting or disturbing the normal operation of the system to thereby prevent large excursions of the output feed rate. The present invention is directed to a new improved means for accomplishing this objective, which is of simplified construction and, hence, more economical.

In accordance with the invention there is provided a weigh feeding system comprising a container prefilled with a substance, a device for discharging the substance from the container at a controllable rate, and apparatus for weighing the container and its contents and for producing an electrical signal proportional to that weight. In addition, said system is further characterized by apparatus actuated by said electrical signal for controlling the discharge of the substance from the container, and detector circuit means actuated by said electrical signal for producing an output which is responsive to predetermined excessive excursions of the electrical signal for locking the discharge control apparatus against deviation during the time of the excessive excursion.

It will be appreciated that due to the double auger mechanism employed in the system of the present invention, accurate volumetric output is maintained even during the periods when the electrical system is temporarily "locked out" due to some external disturbance, or during a refill cycle. Such double auger mechanism is disclosed in U.S. Pat. Nos. 3,186,602 and 3,439,836, for example.

BRIEF DESCRIPTION OF THE DRAWINGS

The accompanying drawings illustrate several embodiments of the invention. In such drawings:

FIG. 1 is a diagrammatic view of a combination of elements embodied in the invention;

FIG. 3 is a schematic diagram of the comparator circuitry shown in block form of FIG. 2;

FIG. 4 is a schematic diagram of the motor drive signal generator shown in block form in FIG. 2;

FIG. 5 is a schematic diagram of the signal holding circuit shown in block form in FIG. 2;

FIG. 6 is a schematic diagram of the detector circuitry shown in block form in FIG. 2.

DETAILED DESCRIPTION OF THE PREFERRED EMBODIMENT

Figure 2:
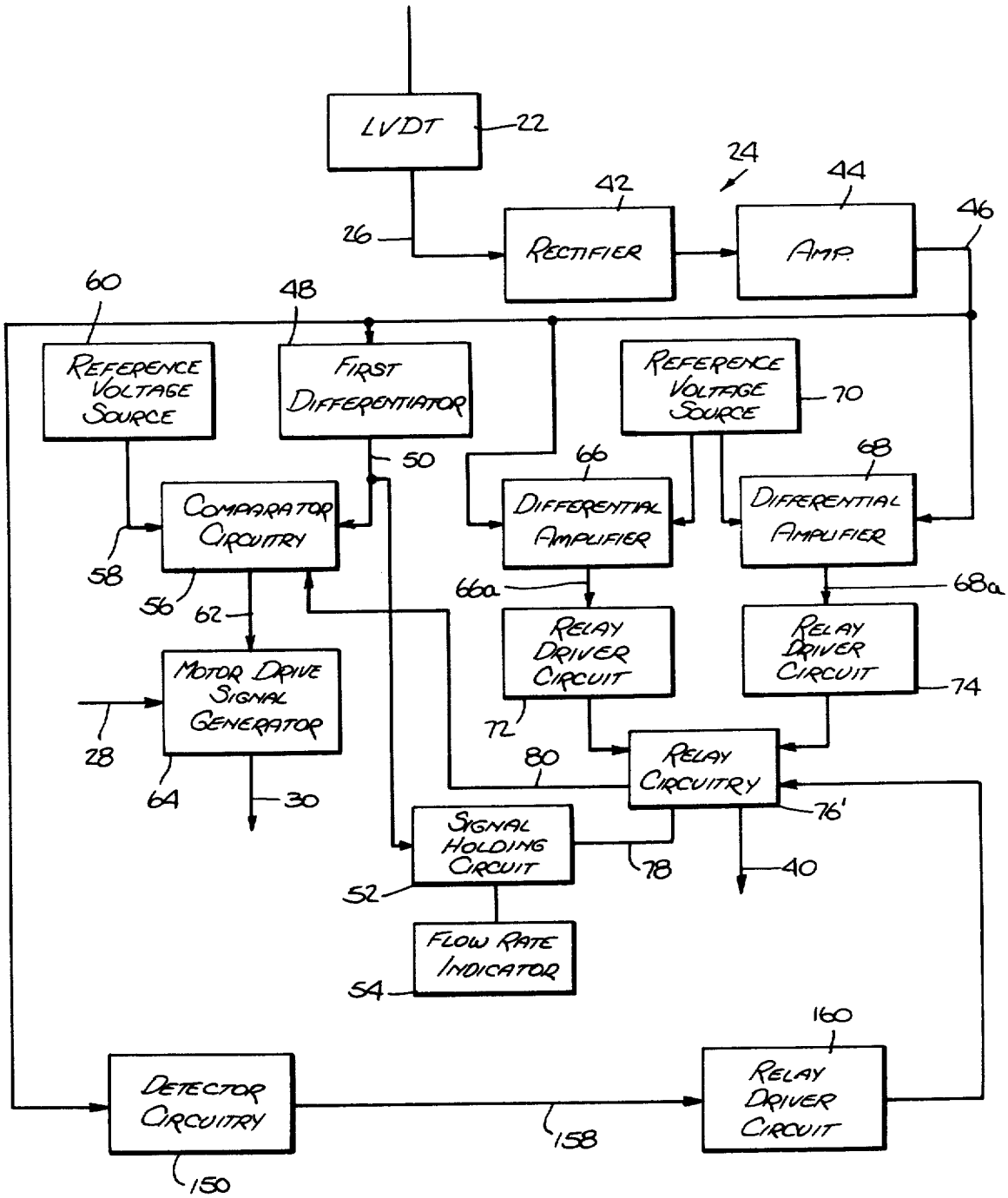
FIG. 2 is a block diagram of the control circuitry embodied in the combination shown in FIG. 1.

The volumetric feeding apparatus of this invention, as shown diagrammatically in FIG. 1, includes a container 10 for a quantity of material, wherein the container has a discharge device 12 connected thereto for feeding the substance out of the container and through the conduit 14. As illustrated, a motor 16 connected through a gear-reduction device 18 is provided for driving the discharge device 12, which, as illustrated in FIG. 1 may comprise an auger mechanism as described in detail in U.S. Pat. No. 3,186,602, issued June 1, 1965. The entire feeding apparatus, including the container, the discharge device, the motor, and the gear-reduction device, is mounted on a scale 20, which may comprise a structure as described in detail in U.S. Pat. No. 3,494,507, issued Feb. 10, 1970.

In accordance with the invention there is provided a detecting device as for example, a linearly variable differential transformer (LVDT) 22, coupled to the scale for providing an electrical signal having an amplitude which is proportional to the weight of the container and its contents. That is, as the contents of the container 10 are discharged, a relative movement occurs between the windings and the core of the LVDT, thereby causing a varying output voltage proportional to the varying weight of the container and its contents. Thus, as the substance is discharged from the container the [LDVT] *LVDT* provides an electrical signal which varies in response to such discharge. The electrical signal from the LVDT is applied to control circuitry 24 by a conductor 26, and the control circuitry also receives a tachometer signal from the motor 16 as a second input thereto. The purpose of the control circuitry 24 is to provide an output signal on a conductor 30 which is used to control the speed of the motor 16, thereby controlling the discharge rate of the substance from the container 10. In particularly, the control [circuitry] *circuitry* operates to maintain the motor speed at a value which provides a desired specific discharge rate for the substance in response to the detection of the actual discharge rate as derived from the LVDT signal, and in response to the actual speed of the motor as determined by the tachometer signal.

As illustrated in FIG. 1, the invention further comprises a second volumetric feeding device 32, also having a container 34, and an auger discharge mechanism 36 for operation to automatically refill the container 10 in order to maintain the fill level of the container 10 between predetermined desired levels. The discharge device 36 is driven by a constant speed motor 38 which is energized by an output signal from the control circuitry as coupled through a conductor 40.

In the embodiment illustrated in FIG. 1, the containers 10 and 34 and discharge devices 12 and 36 are for all types of substances comprising solid particles, but it is to be understood that the combination as described above, may be used also for controlling the discharge of liquid substances from a container, wherefore the augers would be replaced by pumps.

FIG. 2 illustrates a block diagram of the control circuitry 24 which forms a part of the combination shown in FIG. 1, wherein the LVDT output signal is applied to a rectifier 42 for converting the AC signal from the LVDT into a DC signal, which DC signal is then applied to an amplifier 44. The amplified DC signal is coupled through a conductor 46 to a differentiator 48 which provides an output signal directly proportional to the rate of discharge of the substance from the container 10. That is, the LVDT output signal, which comprises a linearly variable electrical signal when the substance is discharged at a constant rate, is differentiated to provide a steady state signal which is directly and linearly proportional to said discharge rate.

The output of the differentiator 48 is coupled along a conductor 50 and through a signal holding circuit 52 to a flow rate indicator 54 for the purpose of providing a visual indication of the detected flow rate of the substance being fed from the container 10.

The output of the differentiator 48 is also applied as an input to a comparator circuit 56, such comparator circuit also having a reference voltage signal as a second input 58 thereto, coupled from a voltage source 60, for the purpose of providing a comparison output signal as related to the two input signals. Thus, the reference voltage signal may be set to correspond to the desired discharge rate for the substance, whereby the output 62 from the comparator circuit provides an error signal as determined by any difference between the reference voltage signal and the actual discharge rate as indicated by the differentiator output 50. Then, the error signal provided by the comparator output 62 is applied to a motor drive signal generator 64 algebraically with the tachometer output signal 28, and the motor drive signal generator then produces an output signal for application to the drive motor. Accordingly, when the actual discharge rate of the substance varies from the desired discharge rate thereof, the error signal from the comparator 56 causes the motor drive signal generator 64 to generate an output which alters the speed of the drive motor 16, thereby changing the discharge rate until it corresponds with the desired discharge rate.

The amplified DC signal corresponding to the LVDT signal is also applied through the conductor 46 as a first input to a pair of differential amplifiers 66 and 68, each of which has a second input connected to different reference voltage source output circuits of a second reference voltage source 70. The purpose of the pair of differential amplifiers 66, 68 is to provide output signals indicating when the quantity of substance within the container 10 falls below the desired minimum quantity, and when the quantity of such substance exceeds a desired maximum quantity. Thus, the reference voltage source 70 provides output signals corresponding to these predetermined desired maximum and minimum quantities. The outputs from the differential amplifiers are coupled through conductors 66a and 68a, and through respective relay driver circuits 72, 74 and applied as inputs to a relay circuit [76] *76'* for controlling the operation of the motor 38 by means of a signal coupled along conductor 40. As described above, operation of the motor 38 causes the container 10 to be refilled from the container 34. Accordingly, the relay circuitry is connected to energize the motor 38 when the minimum detecting differential amplifier 66 generates an output in response to the indication of the minimum quantity of substance, and such relay circuitry maintains the drive motor 38 in an energized state until a signal is received from the maximum detecting differential amplifier 68 indicating that the fill level of the container 10 has reached the desired maximum level. Upon completion of the refill process, the motor 38 is deenergized, but it is to be understood that the discharge of the substance from the container 10 is continuous throughout the period before, during, and after the refill process.

An output 78 from the relay circuitry [76] *76'* is also coupled to the signal holding circuit for causing that circuit to maintain the flow rate indication at the value thereof immediately preceding initiation of the refilling process; and a third output 80 from the relay circuitry [76] *76'* is applied to the comparator circuit 56 in order to maintain the comparison output signal at the value thereof immediately preceding such refill process. That is, the second and third outputs from the relay circuit [76] *76'* prevent grossly erroneous readings on the flow rate indicator 54, and prevent erratic control of the motor drive signal generator 64 while the container 10 is being refilled.

The details of the comparator circuitry 56 are shown in schematic form in FIG. 3, wherein the input 58 from the reference signal source 60 is applied to one input terminal of a unity gain follower amplifier 82, which, for example, may be provided by an integrated circuit such as a Burr-Brown Model No. 3500 device. The connections of the various terminals of the unity gain follower amplifier 82 are as shown in FIG. 3, wherein positive and negative voltage sources V+ and V− are connected thereto, and wherein the output 82a is fed back to one of the input terminals. The output 82a of the unit gain follower amplifier is also connected to one end of a potentiometer 84 which has its other end connected to the output of a unity gain inverter amplifier 85 whose input is connected to the output 50 of the differentiator circuit 48. The wiper arm 84a of the potentiometer is connected to one input 86a of an operational amplifier 86 connected in an inverting feedback mode. The device forming the operational amplifier may comprise a Burr-Brown Model No. 3267/12 C amplifier device. Then, the output of the operational amplifier is connected through a set of relay contacts 88a to the input 90a of an integrating circuit 90, which may comprise, for example, a Burr-Brown operational amplifier Model No. 3308/12C device.

In operation, if the reference voltage signal at 58 is greater than the input signal from the differentiator, more current will flow into the operational amplifier 86, thus causing the output thereof to swing negative. A negative input to the integrator 90 causes its output to go positive, and the time required to reach full output is determined by the input RC network 92 of the integrator and the amplitude of the voltage applied thereto. On the other hand, when the differentiator output voltage is higher than the reference signal, the amplifier output will swing positive thus causing the integrator output to decrease in voltage. In this manner, an error control voltage proportional to the comparison between the actual and desired flow rates is generated by the comparator, and the adjustable RC network 92, provided between the output of the amplifier 86 and the input of the integrator 90, provides a fast increase in the comparator output when a large error is introduced. The zener diode 94 is for clamping the comparator output voltage between a predetermined positive voltage and a voltage of about −0.2 volts as determined by the diode 96.

When the relay contacts 88a are opened, the integrator maintains a constant output voltage at the conductor 62 due to the feedback capacitor 98, since the decay of that output voltage is primarily determined by the leakage of the feedback capacitor and the input impedance of the operational amplifier forming the integrator 90. Thus, during normal operating conditions, the relay contacts 88a remain closed so that a continuously corrected error voltage is produced. However, during the period in which the container 10 is being refilled, the relay contacts 88a are opened, as described below, so that the output signal on the conductor 62 is maintained at the value immediately preceding the opening of contacts 88a.

A difference signal derived from the tachometer output signal on the line 28 and the comparison signal on the line 62 is applied to a terminal 100 of an amplifier 102 connected to a uni-junction pulsing circuit 104, as shown in FIG. 4. FIG. 4 also illustrates a motor armature connection 106, and a field connection 108 for the DC motor 16, wherein the armature and field are connected to a rectifier circuit 110a, which in turn receives an output power signal from an AC source, such as a 110 volt, 60 Hz. supply 112. The AC source 112 is also coupled to a primary winding of a transformer 114, the secondary of which is connected through a unfiltered full-wave rectifier 116 to provide the supply voltage for uni-junction pulse circuit 104 and amplifier 102. Thus, the uni-junction pulser circuit 104 is synchronized with the AC source applied to the rectifier circuit 110. The output of the uni-junction pulser circuit is connected to the primary 118a of a pulse transformer having a pair of secondaries 118b and 118c connected respectively to the gate electrodes to a pair of SCR devices 110b and 110c connected in the full wave bridge which provides the rectifier circuit 110a.

Accordingly, the drive signal applied to the armature of the DC motor is derived from the rectifier circuit 110a and is controlled by the pulsing of the uni-junction transistor circuit 104, wherein the timing of the uni-junction transistor circuit is dependent upon the input 100 to the amplifier portion 102 thereof.

A commutating diode is connected across the rectifying bridge of the circuit 110a to maintain a flow of armature current when the SCR's 110b and 110c are turned off during the negative half cycle of the line voltage. Also, the diodes 120a and 120b in the circuit 110a provide a constant DC voltage for the motor field connection 108.

Again, it is seen that by varying the timing pulses from the uni-junction firing circuit 104, the SCR's 110b and 110c will be controlled to turn on at a varying point with respect to the anode voltages, thus providing a varying DC output for the motor armature, in order to control the speed of the DC motor.

FIG. 5 illustrates an embodiment of the signal holding circuit 52, which may comprise, for example, an operational amplifier such as a Burr-Brown Model No. 3309/12C device, which provides a high input impedance FET amplifier 122 having an extremely low leakage capacitor 124 in its feedback loop. Relay contacts 88b connect the negative input of the amplifier to the output 50 of the differentiator 48, whereby the device 52 operates as a unity gain invertor. That is, while the relay contacts 88b are closed, the differentiator output at line 50 is coupled to the indicator 54 to give an indication of the actual discharge rate. However, when the relay contacts 88b are opened, the value of the output voltage for the circuit 52 remains at the last value of the input level at 50 due to the presence of the low leakage capacitor 124 in the feedback loop. Accordingly, when the relay circuit [76] *76'* operates to initiate the refill process for the container 10, the indicator device 54 is supplied with a constant voltage equivalent to the output from the signal holding circuit 52 immediately prior to the initiation of such refilling process, and such constant voltage is maintained until termination of the refill process and the closing of relay contacts 88b.

Figure 7:
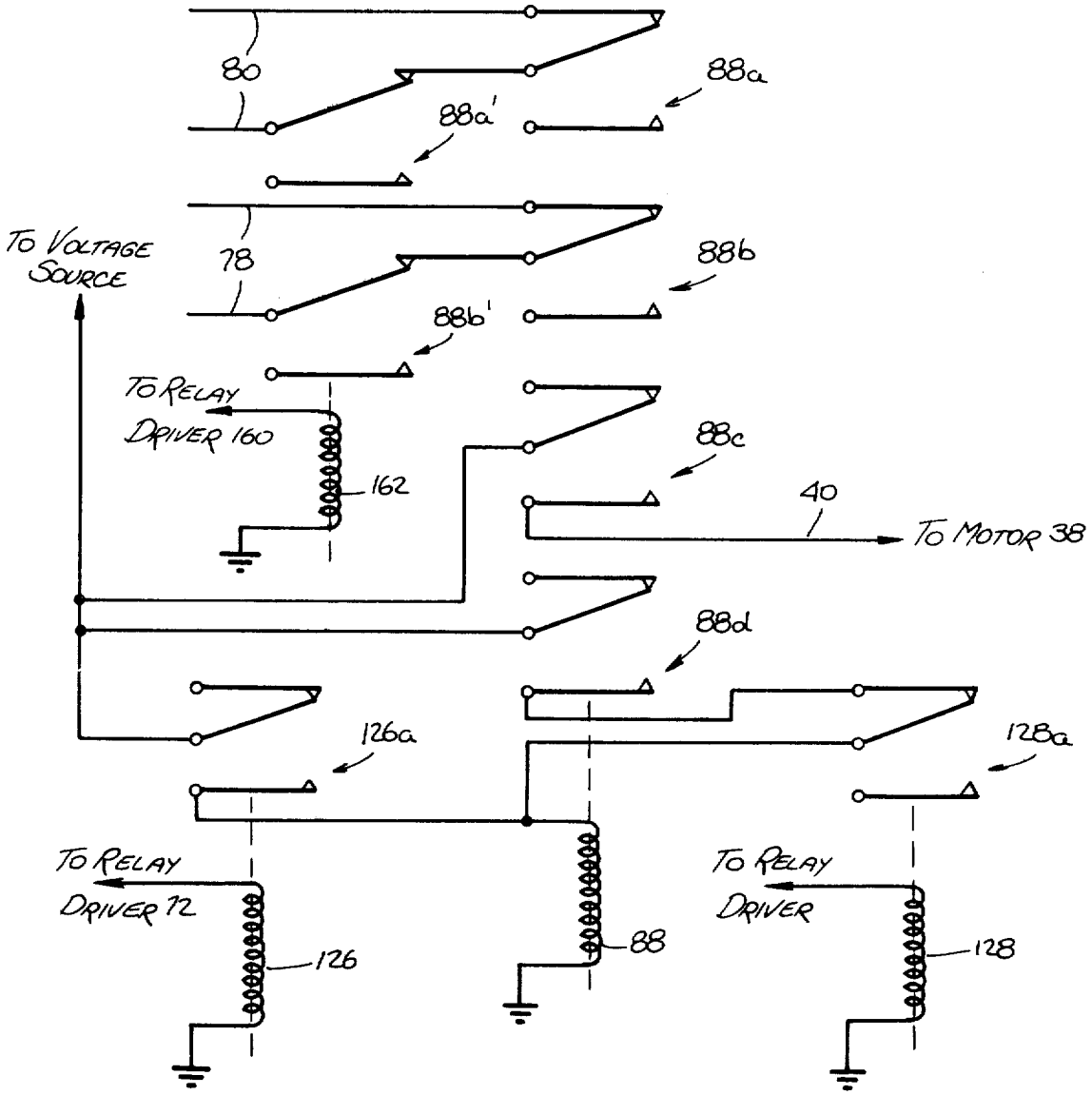
FIG. 7 is a schematic diagram of the relay circuit shown in block form in FIG. 2.

FIG. 7 illustrates a representative relay circuit [76] *76'* wherein a motor drive power source V is coupled through the line 40 to the refill motor 38 through a set of relay contacts 88c, which contacts are controlled by a relay coil 88 having one end connected to a common potential point, and having its other end connected to the power source V through a pair of normally opened contacts 126a of a relay having its coil 126 connected to the relay driver circuit 72 which is controlled by the minimum detecting differential amplifier 66. The coil 88 is also connected to the power source V through the relay contacts 128a of a relay having its coil 128 controlled by the maximum detecting differential amplifier relay driver circuit 74 and through a pair of slave contacts 88d.

In operation, when the minimum detecting differential amplifier 66 provides an output signal, the relay driver circuit 72 causes the relay coil 126 to energize, thereby connecting the voltage source to the coil 88 of the control relay, thus causing it to energize. Accordingly, the refill process is initiated due to the closing of the relay contacts 88c. When the fluid substance level in the container rises sufficiently to cause deenergization of the minimum detecting circuit relay 126, the control relay coil 88 remains energized due to the slave contacts 88d. Also, the signal holding circuit 52 and the comparator circuit 56 are locked in their respective steady state conditions as described above due to the actuation of the relay contacts 88a and 88b which are shown in dotted lines in FIGS. 3 and 5, and which are connected by the conductors 78 and 80 to the respective signal holding and comparator circuit. However, when the maximum detecting differential amplifier 68 generates an output signal through the relay driver circuit 74 to the maximum detecting relay 128, then the energization circuit for the control relay coil 88 is opened, and the refill process is terminated due to the opening of the relay contacts 88c.

It will be appreciated that the weigh feeder may be subject to an external force impinging upon the weigh feeder system, thereby altering the constant upward movement, or velocity, of the system. This alteration results in either acceleration or deceleration of the system, depending upon the direction of the impinging external force. The present invention is directed to the elimination of large excursions of the output feed rate.

As best seen in FIG. 2, there is provided detector circuitry 150 which receives the amplified DC signal corresponding to the LVDT signal through the conductor 46. FIG. 6 illustrates an embodiment of the detector circuitry 150, which comprises an alternating current coupled, adjustable gain amplifier with frequency response 164, which, for example, may be provided by the National Semiconductor Corp., Model No. LM324N. The amplifier 164 has an input terminal 166 which is connected to the conductor 46 through an input capacitor 168 and to ground through a resistor 170. A feedback capacitor 172 is connected between the output terminal 174 and a second input terminal 176 of the amplifier 164. Also, the output terminal 174 of the amplifier is coupled to a feedback potentiometer 178 disposed between two resistors 180 and 182. The other terminal of resistor 182 is connected to ground through a capacitor 184 and a resistor 186 connected in parallel. The sliding contact or wiper arm 188 of the potentiometer 178 is coupled to the input terminal 176 to control the gain of the amplifier 164. Thus, the wiper arm may be considered to be a reference signal source. The output terminal 174 of the amplifier is coupled to a conductor 158 through an output capacitor 190.

Thus, any acceleration, deceleration or abnormal disturbance in the weigh feeder system, as reflected by the signal received by the detector circuitry causes it to emit an output signal 158. As seen in FIG. 2, the output 158 from the detector circuitry 150 is coupled through a relay driver circuit 160 to a relay circuit 76'. This relay circuit is similar to relay circuit 76 *of the above-mentioned patent 3,889,848,* but has added thereto a relay coil 162, FIG. 7, which when energized opens normally closed contacts 88a' and 88b'. Thus, in operation, when the detector circuitry 150 provides an output signal, corresponding to an excessive acceleration or deceleration of the weigh feeder system, the relay driver circuit 160 causes the relay coil 162 to energize, thereby opening relay contacts 88a' and 88b'. These contacts are connected by the conductors 78 to 80 to the respective signal holding and comparator circuits. Consequently, the output signal on the conductor 62 is maintained at the value immediately preceding the opening of contacts 88a' in the same manner as that described hereinbefore in connection with contacts 88a. When the relay contacts 88b' are opened, the value of the output voltage for the circuit 52 remains at the last value of the input level at 50 and, hence, the indicator device 54 is supplied with a constant voltage equivalent to the output from the signal holding circuit 52 immediately prior to the initiation of the excessive deviation, and such constant voltage is maintained until termination of the excessive acceleration or deceleration condition and the closing of the relay contacts 88b', thereby returning the system to normal operation, in the same manner as that described hereinbefore in connection with contacts 88b.

From the foregoing disclosure it can be seen that the instant invention provides an improved weigh feeding apparatus, wherein the discharge rate of a substance from a container may be maintained at a constant value selected from a range of values, and wherein the container may be automatically refilled during the continuous discharge of the substance, and wherein excessive excursions of the system are eliminated.

Although a specific representative structure has been described herein for purposes of explanation, reference should be had to the appended claims in determining the scope of this invention.

We claim:

1. A weigh feeding apparatus comprising a container for a prefilled substance, means for discharging the substance from the container at a controllable rate, means for weighing the container and its contents and for producing an electrical signal proportional to the weight, means actuated by said electrical signal for controlling the discharge of the substance from the container, detector circuit means actuated by said electrical signal for producing an output which is responsive to predetermined excessive excursions of said electrical signal, and means responsive to said output for locking the discharge control means against deviation during the time of said excessive excursion.

[2. A weigh feeding apparatus according to claim 1 wherein said detector circuit means comprises an adjustable gain amplifier.]

3. A weigh feeding apparatus comprising a container for a prefilled substance; means for discharging said substance from the container at a controllable rate; means for weighing said container prefilled with said substance; means coupled to said weighing means for producing an electrical signal proportional to the weight determined by said weighing means; first circuit means having an output terminal and having an input coupled to said electrical signal means for providing a rate signal at said output terminal which is proportional to the discharge rate of said substance from said container; control signal generating means having an output terminal, and having an input terminal connected to said first circuit means output terminal, wherein said control signal means is for generating at its output terminal a discharge control signal which is a function of said rate signal; and means coupled between said control signal generating means output terminal and said means for discharging said substance, for controlling the discharge rate of said discharging means in response to said discharge control signal, detector circuit means having an output terminal and having an input coupled to said electrical signal means for producing an output which is responsive to predetermined excessive excursions of said electrical signal, means coupled between the output terminal of said detector circuit means and said control signal generating means for maintaining said control signal constant during the time of said excessive excursions.

[4. A weigh feeding apparatus according to claim 3 wherein said detector circuit means comprises an alternating current coupled, adjustable gain amplifier with frequency response.]

[5. A weigh feeding apparatus according to claim 3 wherein said detector circuit means comprises an alternating current coupled amplifier, said amplifier having an input terminal connected to the input of the detector circuit means through an input capacitor and to ground through a resistor, a feedback capacitor connected between an output terminal and a second input terminal of said amplifier, said output terminal of the amplifier being coupled to a feedback potentiometer disposed between two resistors, the other terminal of one of said resistors being connected to ground through a capacitor and resistor connected in parallel, and the wiper arm of said potentiometer being coupled to said second input terminal of said amplifier to control the gain of the amplifier, and said output terminal of said amplifier being coupled through an output capacitor to said output terminal of said detector circuit means.]

6. Apparatus for feeding particulate solid material comprising a container for a quantity of said particulate solid material; means for discharging said particulate solid material from the container at a controllable rate; means for weighing said container prefilled with said particulate solid material; means coupled to said weighing means for producing [and] *an* electrical signal proportional in amplitude to the weight determined by said weighing means; differentiator circuit means having an output terminal and having an input coupled to said electrical signal means, wherein said differentiator circuit means is for differentiating said electrical signal to provide a rate signal at said output terminal which is proportional in amplitude to the discharge rate of said particulate solid material from said container; control signal generating means having an output terminal, and having an input terminal connected to said differentiator circuit means output terminal, wherein said control signal means is for generating at its output terminal a discharge control signal which is a function of the amplitude of said rate signal; and means coupled between said control signal generating means output terminal and said means for discharging said particulate solid material for controlling the discharge rate of said discharging means in response to said discharge control signal, electrically actuatable means for refilling said container, first detector means for detecting when the quantity of said particulate [said] *solid* material in said container is less than a desired minimum quantity, second detector means for detecting when the quantity of said particulate solid material in said container is greater than a desired maximum quantity, switching means coupled between said first and second detector means and said means for refilling said container for energizing said electrically actuatable refilling means in response to detection by said first detector means [to] *of* said desired minimum quantity, and for maintaining said refilling means in said energized state until detection by said second detector means of said desired maximum quantity, detector circuitry means having an output terminal and having an input coupled to said electrical signal means for producing an output which is responsive to predetermined excessive excursions of said electrical signal means, means coupled between the output terminal of said detector circuit means and said control signal generating means for maintaining said control signal constant during the time of said excessive excursions.

7. Apparatus for feeding particulate solid material comprising a container for a quantity of said particulate solid material; means for discharging said particulate solid material from the container at a controllable rate; means for weighing said container prefilled with said particulate solid material; means coupled to said weighing means for producing an electrical signal proportional in amplitude to the weight determined by said weighing means; differentiator circuit means having an output terminal and having an input coupled to said electrical signal means, wherein said differentiator circuit means is for differentiating said electrical signal to provide a rate signal at said output terminal which is proportional in amplitude to the discharge rate of said particulate solid material from said container; control signal generating means having an output terminal, and having an input terminal connected to said differentiator circuit means output terminal, wherein said control signal means is for generating at its output terminal a discharge control signal which is a function of the amplitude of said rate signal; and means coupled between said control signal generating means output terminal and said means for discharging said substance, for controlling the discharge rate of said discharging means in response to said discharge control signal, detector circuit means having an output terminal and having [and] *an* input coupled to said electrical signal means for producing an output signal which is responsive to a predetermined excessive excursion of said electrical signal, voltage sensing circuit means coupled between the output terminal of said detector circuit means and said control signal generating means for maintaining said control signal constant during the time of said excessive excursion.

8. Apparatus for feeding particulate solid material, comprising a container for a quantity of said particulate solid material; means for discharging said particulate solid material from the container at a controllable rate; means for weighing said container prefilled with said particulate solid material; means coupled to said weighing means for producing an electrical signal proportional in amplitude to the weight determined by said weighing means; differentiator circuit means having an output terminal and having an input coupled to said electrical signal means, wherein said differentiator circuit means is for differentiating said electrical signal to provide a rate signal at said output terminal which is proportional in amplitude to the discharge rate of said particulate solid material from said container; control signal generating means having an output terminal, and having an input terminal connected to said differentiator circuit means output terminal, wherein said control signal means is for generating at its output terminal a discharge control signal which is a function of the amplitude of said rate signal, and means coupled between said control signal generating means output terminal and said means for discharging said substance, for controlling the discharge rate of said discharging means in response to said discharge control signal; said means for producing said electrical signal being a linearly variable differential transformer; said means coupled between said discharging means and said control signal generating means including an electric motor for driving said discharging means; and said control signal generating means including a reference signal source, a comparator having first and second inputs connected respectively to said reference signal source and said differentiator circuit means output terminal, and having an output for providing a comparison signal in response to said signals from said reference source and differentiator circuit means, and motor drive signal generating means having an input connected to said comparator output, and having an output which provides said discharge control signal for controlling the speed of said motor; detector circuit means having an input connected to said electrical signal means for producing an output signal which is responsive to a predetermined excessive excursion of said electrical signal, voltage sensing circuit means having an input coupled to an output terminal of said detector circuit means, [and] *an* indicating meter for providing a visual indication of the discharge rate of said fluid substance as it is discharged from the container, *and* signal holding means having an input coupled to the differentiator circuit means output to provide an indicating signal to said indicating meter, said voltage sensing circuit means having an output coupled to said signal holding means and said comparator for completing feedback paths in said signal holding means and comparator during the time that said detector circuit means detects said excessive excursion for the purpose of maintaining constant outputs from said comparator and signal holding means during said time.

*9. A weigh feeding apparatus comprising a container for a prefilled substance, means for discharging the substance from the container at a controllable rate, means for weighing the container and its contents for producing an electrical signal proportional to the weight, said electrical signal exhibiting excessive excursions in response to disturbances impinging on said weighing means, means actuated by said electrical signal for controlling the discharge of the substance from the container, detector circuit means actuated by said electrical signal for producing an output which is responsive to predetermined excessive excursions of said electrical signal, and means responsive to said output for locking the discharge control means against deviation during the time of said predetermined excessive excursions.*

*10. Weigh feeding apparatus as in claim 9, wherein said detector means produces an output for each excursion of said electrical signal which has an acceleration or deceleration in excess of a predetermined value, and said responsive means locks the discharge control means against deviation while each said excessive excursion continues.*

*11. Weigh feeding apparatus as in claim 10, wherein said discharge control means includes differentiator circuit means actuated by said electrical signal for producing a second electrical signal which is proportional to the actual rate of discharge of said substance from said container, and wherein said apparatus also includes a discharge rate indicator actuated by said second electrical signal for displaying the actual rate of discharge of the substance from the container, said discharge rate indicator displaying a constant value while the predetermined excessive excursion of the electrical signal continues.*

*12. Weigh feeding apparatus as in claim 11, wherein said discharging means includes a mechanism for moving said substance and a motor for driving said mechanism, and wherein said discharge control means also includes circuit means for establishing a third electrical signal indicative of the desired discharge rate, a comparison circuit for receiving and comparing said second and third electrical signals to produce a fourth electrical signal which is proportional to the difference between said second and third signals, further circuit means for combining said fourth signal with a fifth electrical signal representative of the existing speed of said motor to produce a sixth electrical signal having a value responsive to the relative values of said fourth and fifth signals, and circuit means for delivering said sixth electrical signal to said motor to control the speed thereof.*

*13. A weigh feeding apparatus comprising a container for a prefilled substance, means for discharging the substance from the container at a controllable rate, first circuit means for establishing a first electrical signal indicative of the desired discharge rate, means for weighing the con-*

*tainer and its contents and for producing a second electrical signal proportional to the weight thereof, means actuated by said second electrical signal for differentiating said second signal to produce a third electrical signal representative of the actual rate of discharge of said substance from the container and for controlling the discharge rate in accordance with the relative values of said first and third electrical signals, said discharge control means supplying a control signal to said discharging means, second circuit means for detecting disturbances sensed by said weighing means which occur at a rate which is faster than changes in said actual discharge rate, said second circuit means including detector circuit means actuated by said second electrical signal for producing an output signal which is responsive to predetermined excessive excursions of said second electrical signal, and means responsive to said output signal for locking the discharge control means against deviation during the time of said predetermined excessive excursions.*

*14. A weigh feeding apparatus as in claim 13, wherein, during the time of the predetermined excessive excursions, said responsive means locks the discharge control means at the discharge rate set by the immediately preceding control signal supplied to the discharging means.*

*15. A weigh feeding apparatus comprising a container for a prefilled substance, means for discharging the substance from the container at a controllable rate, means for weighing the container and its contents and for producing an electrical signal proportional to the weight, said electrical signal exhibiting excessive excursions in response to disturbances impinging upon said weighing means, means actuated by said electrical signal for controlling the discharge of the substance from the container, sensing circuit means responsive to said electrical signal for sensing when said weight reaches a predetermined minimum and when it reaches a predetermined maximum, refill means responsive to said sensing circuit means for initiating a refill of said container, while the discharge of substance from said container continues, when the weight has reached said predetermined minimum, and for discontinuing the refill operation when the weight has reached said predetermined maximum, detector circuit means actuated by said electrical signal for producing an output signal which is responsive to predetermined excessive excursions of said electrical signal, and means responsive to said sensing circuit means and to the output signal from the detector circuit means for locking the discharge control means against deviation during the refill operation and during the time of said predetermined excessive excursions.*

*16. Weigh feeding apparatus as in claim 15, wherein said electrical signal exhibits excessive excursions in response to disturbances impinging upon said weighing means which produce forces other than the forces resulting from the weight of the substance in the container, or from the changes in such weight, wherein said detector circuit means produces an output signal for each excursion of said electrical signal which has an acceleration or deceleration in excess of a predetermined value, and wherein said responsive means locks the discharge control means against deviation while said excessive excursion continues.*

*17. Weigh feeding apparatus as in claim 16, wherein said discharge means constitutes a double auger mechanism for maintaining a constant volumetric feeding of the substance while said responsive means is operating to lock the discharge control means against deviation.*

*18. A weigh feeding apparatus comprising a container for a prefilled substance, means for discharging the substance from the container at a controllable rate, means for weighing the container and its contents and for producing an electrical signal proportional to the weight, said electrical signal changing in value as substance is discharged from the container and the weight of its contents decreases, said electrical signal changing in value more rapidly and exhibiting an excessive excursion for each disturbance which is sensed by said weighing means as a more rapid change in weight, means actuated by said electrical signal for controlling the discharge of the substance from the container, circuit means for providing protection against excessive disturbances including detector circuit means actuated by said electrical signal for producing an output which is responsive to predetermined excessive excursions of said electrical signal, and means responsive to said output for locking the discharge control means against deviation during the time of said excessive excursions.*

*19. Weigh feeding apparatus as in claim 18, wherein said detector circuit produces an output for each change of said electrical signal beyond a predetermined amount, from one instant in time to the next, and said responsive means is for locking said discharge control means against deviation during the time such change occurs.*

* * * * *